Aug. 10, 1965    R. N. EICHORN    3,199,780
COUNTER CORRECTING APPARATUS
Filed Sept. 7, 1962
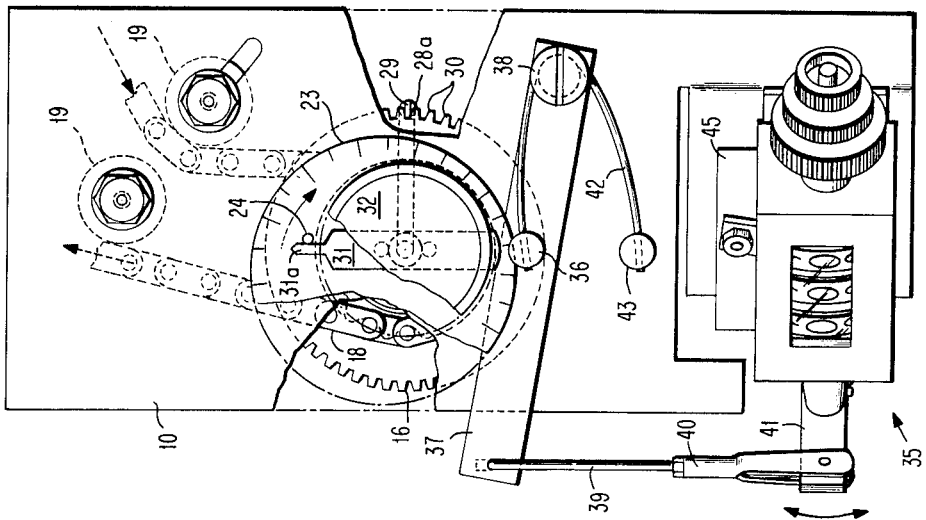
INVENTOR
ROBERT N. EICHORN
BY *K. P. Johnson*
ATTORNEY United States Patent Office 3,199,780
Patented Aug. 10, 1965

3,199,780
COUNTER CORRECTING APPARATUS
Robert N. Eichorn, Endicott, N.Y., assignor to International Business Machines Corporation, New York, N.Y., a corporation of New York
Filed Sept. 7, 1962, Ser. No. 221,961
9 Claims. (Cl. 235—132)

This invention relates generally to item counters and more particularly to adjustable actuating devices for such counters.

In the manufacture or processing of items made to order such as custom printed documents, by high speed, mass production machines, an accurate count of the items completed must be maintained to determine when a pending order has been filled so that excess items are not produced which would have to be discarded. The manufacturing machines are usually operated under the control of a counter which automatically provides a stop signal, e.g., an electrical impulse, when a predetermined number of items have been produced. The counter may be either incremented to signal completion upon reaching the desired item count or be decremented from some preset item count to signal completion upon reaching zero. Each counted item of production may represent a single unit or a plurality of units which compose a lot or batch.

As the items are completed they are inspected manually or automatically and those which do not comply with the specifications are removed from the accumulating items. The defective items are often removed after having been already registered by the counter so that if the item counter is not adjusted before reaching the predetermined count, production will be terminated with a shortage of acceptable items. When this occurs, there may be involved a costly delay or extensive labor in restarting a complicated machine for a short rerun to produce additional replacement items. For instance, in high speed printing presses a large portion of the documents produced by the machine may be defective until the machine reaches its optimum speed. Furthermore, the restart may require the presence of a highly skilled operator who is handling several machines so that each restart necessitates lost time on other machines.

An alternative which decreases the number of machine restarts is, of course, to set the item counter to some quantity greater than that actually required for the pending order. This method, however, fails when the number of imperfect items varies with each order so that either an excess or shortage of acceptable items results at one time or another.

As an attempt to more closely approach the exact quantity desired for each order, counters and drive mechanisms therefor have been devices which are adjustable during machine operation. With such counters, the machine operator disengages the counter drive mechanism from its operating machine near the end of the production run, adds the desired number of replacement items to the present count, and re-engages the counter drive mechanism with the machine. Although these adjustable counters enable a closer control of production, there still remains the disadvantage with high speed machines that a significant group of items were not counted during the finite time required for disengagement of the driving mechanism and counter readjustment. The adjusted count actually entered in the counter during operation must still be governed by the skill and ability of the machine operator to compensate for the uncounted items.

Accordingly, it is a primary object of this invention to provide a counting device which can be readjusted with improved accuracy during operation.

Another object of this invention is to provide a counting device which is operated during readjustment thereof.

Another object of this invention is to provide an adjustable driving mechanism for a counter in which actuating movement from a machine is transmitted to the counter through an auxiliary coupling when the normal coupling is disabled during adjustment.

Yet another object of this invention is to provide a counting device for item production that may be adjusted during operation of a production machine to change the number of items to be accumulated under control of the device without failing to count any items produced during the adjustment.

In accordance with the foregoing objects, the invention provides a driven means having movement imparted thereto in proportion to the items being produced or accumulated, which motion is transmitted to a cyclically operable actuating means of a counter through either a first or second coupling means. The first coupling means normally transmits the movement to the actuating means and is adapted to be disengaged from the driven means and actuating means and moved in the reverse direction to enter an exact, predetermined amount of lost motion into the coupling means which represents a particular number of items whereupon the coupling means is again engaged with the driven means and actuating means. The lost motion entered into the first coupling means is representative of a particular number of items to be counted. When disengagement of the first coupling means occurs, the second or auxiliary coupling means becomes effective to transmit the movement of the driven means to the actuating means but is rendered ineffective as soon as the first coupling means is re-engaged in its operating position. Because of the auxiliary coupling provided during adjustment of the first coupling means, no movement is omitted that is representative of the accumulated items.

The invention has the feature of using a rotatable cam to change unidirectional motion of the driven means into oscillatory motion for operating the counter. The cam is easily replaced with others having varying numbers of lobes thereon so that by appropriately changing the cam and rate of movement of the driven means, the counting device is operable to register a count for each unit or for variable pluralities of units.

The foregoing and other objects, features and advantages of the invention will be apparent from the following more particular description of a preferred embodiment of the invention, as illustrated in the accompanying drawings.

In the drawings:

FIGURE 1 is an elevation view, partially in section, of the counter and driving mechanism therefor showing the essential features of the invention;

FIGURE 2 is a plan view of the device shown in FIG. 1 with portions broken away to more clearly illustrate the counter actuating mechanism; and FIGURE 3 is a plan view of an alternative cam which may be used in the counter actuating mechanism.

Referring to FIGS. 1 and 2, a support plate 10 has secured in a hole 11 therein a sleeve 12 in which a hollow shaft 13 is rotatably mounted. Secured to the shaft by a set screw 15 is a hub 14 having fixed to one end thereof a spur gear 16 and to the opposite end a chain sprocket 17 engaged with a driving chain 18. The chain is driven (in the direction of the arrow in FIG. 2) by any sprocket (not shown) suitably secured to a rotating member such as a drive shaft of a manufacturing or processing machine. The drive chain may be guided about sprocket 17 by idlers 19 suitably mounted on support plate 10. As an increment of movement is imparted to the chain for each unit produced or processed, hub 14, spur gear 16, sprocket 17 and shaft 13 rotate in unison.

A washer 21 is of rigid material and is secured to the right end of shaft 13 (FIG. 1) as by a press fit for rotation therewith so that the washer serves as a clutch plate. Adjacent to washer 21 and mounted for free rotation on shaft 13 is another washer 22 of resilient material with a high coefficient of friction, such as rubber. Also freely supported on shaft 13 for rotation thereabout is an eccentric disc or cam 23 having a pin 24 secured thereto by which the cam may be driven to supply oscillatory motion to the counter assembly.

The cam is normally supplied with rotary motion from hub assembly 14 to an adjustable drive linkage comprising J-shaped pawl 28, adjusting knob 32 and a pointer 31 in engagement with pin 24. The J-shaped pawl is rotatably mounted in hollow shaft 13 and the short leg 28a of the pawl has formed at the end thereof a tooth 29 which is engageable between any two teeth 30 on spur gear 16. The remaining portion of pawl 28 supported in shaft 13 extends beyond the end of the shaft (to the right in FIG. 1) through a hole in pointer 31 and is secured to adjusting knob 32 which is preferably knurled for gripping convenience. Pointer 31 of dished contour (FIG. 1) is suitably secured to the knob as by screws and engages the cam surface at each end thereof so that tip 31a is engaged with driving pin 24 on the cam. Pointer 31 is preferably made of some resilient material like spring steel so that it permits adjusting knob 32 to be depressed or moved to the left in FIG. 1 sufficiently to disengage tooth 29 from spur gear teeth 30. When the adjusting knob is so moved to disengage pawl 28, the force required for disengagement is transmitted directly by the pointer 31 to cam 23 and moves the cam longitudinally on shaft 13 to compress resilient friction washer 22 between the cam and rigid washer 21 secured to rotating shaft 13. Thus, when pawl 28 is disengaged from spur gear 16, the motion transmitted to washer 21 is further transmitted to cam 23 through friction washer 22.

The rotary movement of the cam due either to pawl 28 or friction washer 22 is used to supply oscillatory actuating movement to a counter assembly 35 through cam follower 36 fixed on lever 37 which is pivotally mounted on support member 10 at stud 38. A link 39 has one end thereof secured to the free end of lever 37 for movement relative thereto and has fixed to its other end adjustable clevis 40 which is fastened by a pin to counter operating arm 41 of counter assembly 35. Cam follower 36 and lever 37 are maintained against cam 23 by any suitable resilient member such as expansion spring 42 mounted about pivot stud 38 with its ends secured either to cam follower 36 or to a stud 43 fixed to support member 10. Cam 23 is mounted on shaft 13 with sufficient eccentricity so that upon each rotation of the cam, its follower 36 and lever 37 will transmit a single cycle of oscillatory motion to link 39, clevis 40 and arm 41 to register a count in counter assembly 35.

The counter assembly may be any of the well-known, commercially available types which can be incremented or decremented one count upon a complete oscillatory cycle of its actuating arm. The counter assembly illustrated is one which can be manually preset to a desired count and decremented once each cycle until a counter reading of zero is reached at which time electrical contacts are closed in a switch 45 attached to the counter assembly. By appropriately connecting the contacts in the control circuit of a manufacturing or processing machine, the machine can be stopped after a predetermined number of items have been registered in the counter.

In operation, counter assembly 35 is preset to the desired quantity of items to be accumulated by a processing machine after cam 23 has been rotated to a position where it has just caused the counter to register a count. Knurled knob 32 is depressed sufficiently toward support member 10 to disengage pawl tooth 29 from teeth 30 and rotated so that pointer tip 31a engages pin 24 on the cam, at which time pressure from the adjusting knob is relieved and tooth 29 is permitted to engage a pair of teeth 30 on gear 16. Drive chain 18 is supplied with movement from a source (not shown) which represents an item of production. A ratio of the driving and driven chain sprockets is selected so that a revolution of driven sprocket 17 represents some predetermined quantity of production units, for example, ten. As the driving sprocket moves chain 18 in the direction of the arrow of FIG. 2, hub assembly 14 is rotated so that the rotary motion is transmitted by gear 16 through pawl 28, adjusting knob 32 and pointer 31 to pin 24 and cam 23. During this time, there is no relative motion between pawl 28 and hollow shaft 13, washer 21, friction washer 22 and cam 23. These elements move as a unit during the normal transmission of the chain movement to the cam. As the cam is rotated by pointer 31, each complete revolution of the cam results in decreasing the preset count in counter assembly 35 by one. After sufficient successive operations of the cam, the counter will reach zero causing the electrical contacts of the switch to close and terminate operation of the production machine.

Suppose however, that during the accumulation of the completed production units by the processing machine, a machine operator finds upon inspection, five defective units of production and removes them from the accumulated units. The production machine must then produce five additional units to replace those which were defective and removed. During the time the production machine is still operating, the machine operator depresses adjusting knob 32 (to the left in FIG. 1) forcing pointer 31 to flatten which forces cam 23 longitudinally along shaft 13 which causes friction washer 22 to become compressed. Because clutch washer 21 is fixed to shaft 13, it rotates with the shaft in an advancing direction and causes its motion to be transmitted to cam 23 through friction washer 22 even though the adjusting knob has been depressed to disengage pawl 28 from the teeth of spur gear 16.

With the pawl disengaged from its positive driving position, adjusting knob 32 is rotated in a reverse direction to move pointer tip 31a away from pin 24 a predetermined distance equivalent to the distance moved by five production units, which, in this example, would be 180° or half way around the cam. When movement of pointer 31 has been completed, the adjusting knob is released and pawl 28 is again engaged with the gear teeth at the new position to restore the positive movement of the gear to the pointer. The re-engagement of pawl 28 through the release of the adjusting knob relieves the compression on washer 22 so that it no longer drives cam 23, and the cam is no longer moved until pointer 31 has been moved sufficiently to contact pin 24 to make up for the amount of lost motion entered with the adjusting knob in the drive coupling. In order to enter a correction factor in the drive coupling, knob 32 may be depressed and turned in the reverse direction until the desired distance between pointer 31 and pin 24 is obtained at which time the knob is released, or the knob may be depressed and held until pin 24 moves away from pointer 31 the proper distance at which time the knob is released.

The amount of lost motion entered between pointer tip 31a and pin 24 is determined by the number of units to be replaced by the production machine and can be varied in one adjustment to add the production units represented by the complete revolution of the pointer relative to the cam. Thus, when replacement units of production are to be accumulated, no production count is lost due to the time that a machine operator requires to accomplish counter adjustment with knob 32. Because of this, an extremely accurate addition of units may be made in the counting mechanism. The surface of the cam adjacent pointer 31 is preferably inscribed with appropriate scale marks so that the amount of lost motion to be entered by an operator can be readily determined without relying on approximations.

The counting apparatus as described above is especially adapted for counting as items, lots or batches of units, and can be adjusted at one time to add one item to the accumulated items. The mechanism may, however, be altered by replacing the cam and changing the ratio of the driving and driven sprockets so that more items may be added in a single adjustment. An example of another cam is shown in FIG. 3 which permits the addition of two items in one adjustment. The velocity of the drive chain would have to be decreased to have the original counting rate. In this figure, cam 50 having a drive pin 24, is concentrically mounted relative to shaft 13 and has formed on its periphery two lobes 51 for actuating the counter. One revolution of the cam will actuate the counter twice. Other cams having still more lobes may, of course, be used to permit a wider range of item count adjustment.

The counter mechanism may be modified to the point that, with appropriate driving chain movement and a multi-lobed cam, the counter would register a count for each unit. Such a modification, however, discourages the use of the device on a high speed production machine because of the actuating rate limitation of the counter assembly.

The counting apparatus as shown in FIGS. 1 and 2 is especially adapted to printing presses in which the document output of the press may range from 1000 to 1500 documents per minute and an inch of chain movement may represent a particular number of documents. In such an application the number of rejected or unacceptable documents is also determined in inches. The lost motion entered into the primary drive coupling of the pawl and pointer is correspondingly determined to be inches of documents. In this case, a count registered on counter assembly 35, or one revolution of cam 23 may indicate several inches or a carton of documents which have been completed.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. Apparatus of the class described comprising:
a register for registering as items predetermined increments of motion;
driven means having motion imparted thereto representative of items being accumulated;
clutch means between said register and said driven means for transmitting said motion in a predetermined direction to said register, with said clutch means capable of being disengaged to vary the amount of motion so transmitted; and
auxiliary transmission means becoming operable when said clutch means is disengaged for transmitting said motion in said predetermined direction to said register.
2. Apparatus of the class described comprising:
a register for registering as items predetermined increments of movement;
driven means having continuous movement imparted thereto;
coupling means engageable between said driven means and said register for transmitting said movement to said register, said coupling means being disengageable during said movement from both said register and said driven means to enter a predetermined quantity of lost motion therein and being re-engageable with said driven means thereafter; and
auxiliary clutch means between said driven means and said register for transmitting said movement to said register when said coupling means is disengaged.
3. Driving apparatus for a counter comprising:
actuating means for operating said counter;
a driven member having movement imparted thereto;
first clutch means movable between engaged and disengaged positions and operable in said engaged position to couple the movement of said driven member to said actuating means for movement in a predetermined direction; and
second clutch means between said actuating means and said driven member for imparting the motion of said member to said actuating means in said predetermined direction when said first clutch means is in said disengaged position.
4. A device for counting batches of accumulated units and varying the quantity of units per batch comprising:
driven means continuously moved in proportion to the quantity of units accumulated;
counting means adapted to register one batch for each predetermined increment of distance said driven means is moved;
means for coupling said driven means to said counting means, said coupling means being capable of being decoupled to enter a predetermined quantity of lost motion in said coupling to thereby vary the units in a batch; and
auxiliary clutch means effective during said decoupling for transmitting the movement of said driven means to said counting means.
5. A device for counting predetermined quantities of accumulating units as batches and varying the quantity of units in each batch comprising, in combination:
driven means moved in proportion to the quantity of units so accumulating;
a counter for registering a predetermined increment of movement thereof as a batch;
clutch means for transmitting the motion of said driven means to said counter, said clutch means being adapted for selective disengagement to enter lost motion therein;
control means operable to disengage said clutch means for entering a selectable amount of lost motion therein; and
auxiliary coupling means for transmitting the motion of said driven means to said counter during said disengagement of said clutch means.
6. A device for counting predetermined quantities of accumulating units as batches and varying the quantity of units in each batch comprising, in combination:
indicating means producing an output manifestation increasing in magnitude in proportion to the quantity of items being accumulated;
counter means adapted to respond to an input manifestation thereto of increasing magnitude and register as a unit batch each predetermined increment of magnitude of said input manifestation;
means for transmitting said output manifestation to said counter means as an input signal, said transmitting means being selectively adjustable to terminate said transmission for a predetermined period; and
auxiliary means for transmitting said output manifestation to said counter means as an input signal thereto during the adjustment of said transmitting means.
7. An actuating device for a counter registering batches of accumulating units, comprising:
driven means continuously moved in proportion to the quantity of units being accumulated;
a counter for registering batches of said units;
actuating means operable to advance said counter upon predetermined increments of movement therein;
clutch means transmitting the motion of said driven means to said actuating means, said clutch means being selectively settable to include a predetermined amount of lost motion therein to vary the quantity of units in a batch; and auxiliary coupling means effective during said selective setting of said clutch means to transmit the movement of said driven means to said actuating means.

8. An actuating device for a counter registering batches of accumulating units which comprises:

driven means continuously moved in proportion to the units accumulating;

a counter for registering batches of units;

actuating means operable to register a count in said counter for each predetermined increment of motion of said driven means;

lost motion clutch means for transmitting the motion of said driven means to said actuating means, said clutch means being movable between engaged and disengaged positions relative to said driven means for entering selected amounts of lost moton in said clutch means while in said disengaged position; and auxiliary coupling means between said driven means and said actuating means and controlled by said clutch means in said disengaged position for transmitting the motion of said driven means to said actuating means.

9. A device as described in claim 8 wherein:

said auxiliary coupling means comprises a resilient frictional element compressible by said clutch means in said disengaged position to effectuate transmission of motion between said driven means and said actuating means.

References Cited by the Examiner

UNITED STATES PATENTS

| | | | |
|---|---|---|---|
| 2,193,108 | 3/40 | Mettler | 194/3 |
| 2,368,761 | 2/45 | Hogan | 235—91 |
| 3,027,076 | 3/62 | Glass | 235—117 |

LEO SMILOW, *Primary Examiner.*

ROBERT EVANS, *Examiner.*